United States Patent
Hunt et al.

(10) Patent No.: US 12,166,877 B2
(45) Date of Patent: Dec. 10, 2024

(54) SYSTEMS AND METHODS FOR UTILIZING HARDWARE ASSISTED PROTECTION FOR MEDIA CONTENT

(71) Applicant: McAfee, LLC, Santa Clara, CA (US)

(72) Inventors: Simon Hunt, Naples, FL (US); Venkata Ramanan Sambandam, Sunnyvale, CA (US)

(73) Assignee: MCAFEE, LLC, San Jose, CA (US)

( * ) Notice: Subject to any disclaimer, the term of this patent is extended or adjusted under 35 U.S.C. 154(b) by 191 days.

(21) Appl. No.: 16/849,386

(22) Filed: Apr. 15, 2020

(65) Prior Publication Data

US 2020/0364319 A1 Nov. 19, 2020

Related U.S. Application Data

(63) Continuation of application No. 14/866,324, filed on Sep. 25, 2015, now abandoned.

(51) Int. Cl.
*H04L 9/14* (2006.01)
*G06F 21/10* (2013.01)
(Continued)

(52) U.S. Cl.
CPC .............. *H04L 9/14* (2013.01); *G06F 21/107* (2023.08); *G06F 21/16* (2013.01); *G06F 21/53* (2013.01);
(Continued)

(58) Field of Classification Search
CPC ....... H04L 9/14; H04L 9/0819; H04L 9/3242; H04L 9/3247; H04L 2209/60;
(Continued)

(56) References Cited

U.S. PATENT DOCUMENTS

| 5,910,987 A | 6/1999 | Ginter et al. |
| 6,226,618 B1 | 5/2001 | Downs et al. |

(Continued)

FOREIGN PATENT DOCUMENTS

| CA | 2869817 | 10/2013 |
| CN | 1183841 | 6/1998 |

(Continued)

OTHER PUBLICATIONS

China National Intellectual Property Administration, "Office Action," mailed in connection with Chinese Patent Application No. 201680057380.X, on Feb. 9, 2021, 17 pages (including English machine translation).

(Continued)

*Primary Examiner* — Mohammad A. Nilforoush
*Assistant Examiner* — Wodajo Getachew
(74) *Attorney, Agent, or Firm* — Hanley, Flight & Zimmerman, LLC

(57) ABSTRACT

This disclosure describes systems and methods related to utilizing hardware assisted protection for media content. In some embodiments, a provided method comprises: receiving, from a content server and by a computing device processor of a secure enclave of a device, first encrypted media content; decrypting, by the computing device processor, the first encrypted media content using a first decryption key; generating, by the computing device processor, a second decryption key; encrypting, by the computing device processor, the first decrypted media content using the second key, thereby resulting in second encrypted media content; and sending, by the computing device processor and to one or more graphical processing units (GPUs) comprised in a graphics component of the device, the second encrypted media content and the second decryption key.

18 Claims, 4 Drawing Sheets

(51) Int. Cl.

| | |
|---|---|
| *G06F 21/16* | (2013.01) |
| *G06F 21/53* | (2013.01) |
| *G06F 21/60* | (2013.01) |
| *G06Q 20/32* | (2012.01) |
| *G06Q 20/38* | (2012.01) |
| *G09C 5/00* | (2006.01) |
| *H04L 9/08* | (2006.01) |
| *H04L 9/32* | (2006.01) |
| *G06Q 20/12* | (2012.01) |

(52) U.S. Cl.
CPC ....... *G06F 21/602* (2013.01); *G06Q 20/3227* (2013.01); *G06Q 20/3829* (2013.01); *H04L 9/0819* (2013.01); *H04L 9/3247* (2013.01); *G06F 21/1063* (2023.08); *G06F 2221/2149* (2013.01); *G06Q 20/1235* (2013.01); *G06Q 2220/00* (2013.01); *G09C 5/00* (2013.01); *H04L 9/3242* (2013.01); *H04L 2209/60* (2013.01); *H04L 2209/76* (2013.01)

(58) Field of Classification Search
CPC ..... H04L 2209/76; G06F 21/10; G06F 21/16; G06F 21/53; G06F 21/602; G06F 2221/0733; G06F 2221/0737; G06F 2221/0755; G06F 2221/2149; G06Q 20/1235; G06Q 20/3227; G06Q 20/3829; G06Q 2220/00; G09C 5/00
USPC .......................................................... 705/71
See application file for complete search history.

(56) References Cited

U.S. PATENT DOCUMENTS

| | | | |
|---|---|---|---|
| 6,859,791 B1* | 2/2005 | Spagna ................ | H04L 69/329 705/317 |
| 7,415,721 B2 | 8/2008 | Fransdonk | |
| 8,572,411 B2 | 10/2013 | Ginter et al. | |
| 8,832,452 B2 | 9/2014 | Johnson et al. | |
| 9,097,200 B2 | 8/2015 | Yamauchi et al. | |
| 2007/0294170 A1 | 12/2007 | Vantalon et al. | |
| 2012/0036584 A1* | 2/2012 | Risan ...................... | G06F 21/10 726/28 |
| 2012/0079270 A1* | 3/2012 | Patel .................. | H04N 21/4627 713/165 |
| 2013/0275755 A1* | 10/2013 | Ignatchenko ...... | H04N 21/4408 713/168 |
| 2014/0095890 A1 | 4/2014 | Mangalore et al. | |
| 2015/0121536 A1 | 4/2015 | Xing et al. | |
| 2015/0178481 A1 | 6/2015 | Chhabra et al. | |
| 2015/0302543 A1* | 10/2015 | Weaver ............ | H04N 21/44008 382/100 |
| 2015/0304736 A1 | 10/2015 | Lal et al. | |
| 2017/0093572 A1 | 3/2017 | Hunt et al. | |

FOREIGN PATENT DOCUMENTS

| | | |
|---|---|---|
| CN | 1320232 | 10/2001 |
| CN | 101040265 | 9/2007 |
| CN | 102918539 | 2/2013 |
| CN | 104813336 | 7/2015 |
| WO | 2014196966 | 12/2014 |

OTHER PUBLICATIONS

China National Intellectual Property Administration, "Office Action," mailed in connection with Chinese Patent Application No. 201680057380.X, on Aug. 24, 2020, 23 pages (including English translation).
International Searching Authority, "International Search Report and Written Option," mailed in connection with International Patent Application No. PCT/US2016/043829, on Nov. 3, 2016, 12 pages.
International Bureau, "International Preliminary Report on Patentability," mailed in connection with International Patent Application No. PCT/US2016/043829, on Apr. 5, 2018, 12 pages.
National Intellectual Property Administration of China, "Office Action," mailed in connection with Chinese Patent Application No. 201680057380 X, on Nov. 21, 2019, 35 pages.
White, "How Computers Work," Que, Indianapolis, 7th Edition, Oct. 15, 2003, 23 pages.
United States Patent and Trademark Office, "Final Office Action" issued in connection with U.S. Appl. No. 14/866,324, mailed on Jan. 16, 2020, 27 pages.
United States Patent and Trademark Office, "Non-Final Office Action," issued in connection with U.S. Appl. No. 14/866,324, mailed on Jun. 6, 2019, 23 pages.
United States Patent and Trademark Office, "Office Action," issued in connection with U.S. Appl. No. 14/866,324, mailed on Nov. 16, 2018, 6 pages.
China National Intellectual Property Administration, "First Search Report" mailed in connection with Chinese Patent Application No. 201680057380.X, on Nov. 8, 2019, 2 pages.
China National Intellectual Property Administration, "Supplemental Search Report" mailed in connection with Chinese Patent Application No. 201680057380.X, on Aug. 18, 2020, 2 pages.
Patent Cooperation Treaty, "International Search Report," issued in connection with International Patent Application No. PCT/US2016/043829, mailed on Nov. 3, 2016, 3 pages.
International Searching Authority, "Written Opinion of the International Searching Authority," issued in connection with International Patent Application No. PCT/US2016/043829, mailed on Nov. 3, 2016, 9 pages.

\* cited by examiner

SYSTEMS AND METHODS FOR UTILIZING HARDWARE ASSISTED PROTECTION FOR MEDIA CONTENT

CROSS-REFERENCE TO RELATED APPLICATION(S)

This patent arises from a continuation of U.S. patent application Ser. No. 14/866,324, which is entitled "SYSTEMS AND METHODS FOR UTILIZING HARDWARE ASSISTED PROTECTION FOR MEDIA CONTENT," and which was filed on Sep. 25, 2015. Priority to U.S. patent application Ser. No. 14/866,324 is claimed. U.S. patent application Ser. No. 14/866,324 is incorporated by reference herein in its entirety.

TECHNICAL FIELD

This disclosure generally relates to systems and methods for electronic security and, more particularly, to utilizing hardware assisted protection for media content.

BACKGROUND

As wireless streaming of media content becomes increasingly prevalent, risks associated with piracy and/or unauthorized redistribution of the media content are also increasing. In particular, content providers are faced with a variety of challenges associated with securely distributing media content to authorized content subscribers while preventing its unauthorized redistribution.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
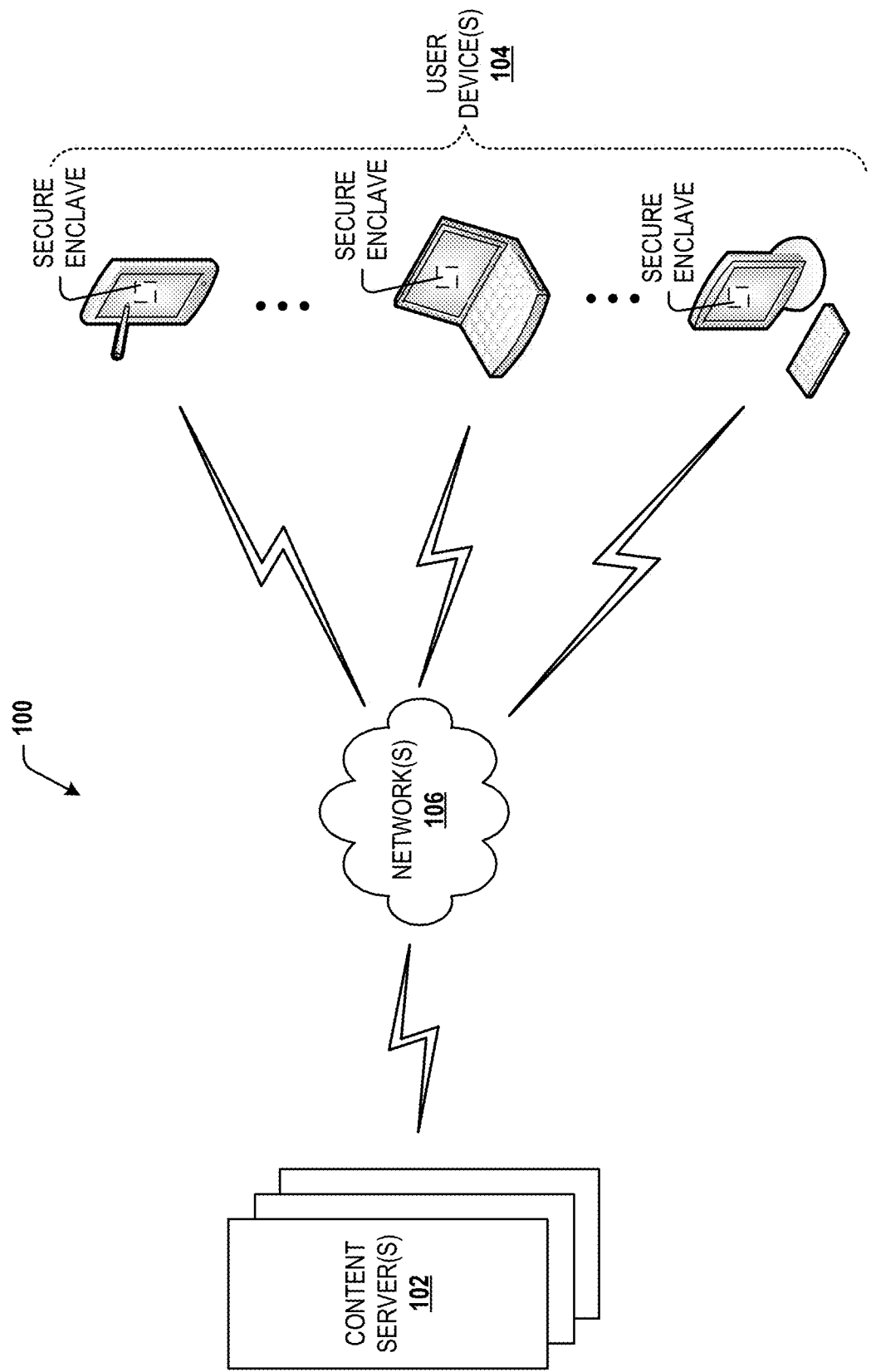
FIG. 1 depicts an example communication system, in accordance with one or more embodiments of the disclosure.

The detailed description is set forth with reference to the accompanying drawings, which are not necessarily drawn to scale. The use of the same reference numbers in different figures indicates similar or identical items. Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments. The terms "content server," "user device," "communication station," "station," "handheld device," "mobile device," "wireless device," and/or "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

One or more example embodiments discussed herein relate to systems, methods, and devices for utilizing hardware assisted protection for media content, such as video content or audio content. For example, a secure enclave may be utilized within a user device (e.g., a computing device) to create a protected media distribution system. The secure enclave may be a separate, isolated portion of the user device (e.g., hardware) that is configured with software, hardware, or a combination of software and hardware, to separately process (e.g., received, decoded, and/or the like) and/or display media content. More specifically, the secure enclave may be directly coupled with a graphical processing unit (GPU) and may include a separate media player (e.g., video and/or audio player) so that media content may be processed and/or a presentation of the media content generated (e.g., for displaying or playing) entirely within a secure environment. In this manner, media content (as well as any associated data) is secured and protected from being accessed, manipulated, and/or controlled by software and/or hardware outside of the secure enclave of the user device.

In the event that the secure enclave does not include a separate media player, the secure enclave may communicate with one or more elements of the user device for using a media player local to the user device, which may expose video content, for example, to potential risks of corruption and/or theft. Therefore, in such circumstances, systems, methods, and devices described herein may utilize the secure enclave of the user device for encoding media content with a watermark including a unique identification (ID) indicating a particular platform (e.g., secure enclave and/or user device) and/or user account associated with the platform, that was initially authorized to receive the media content. In this manner, the watermark can be used by authorities and/or content providers to trace any illegal and/or stolen versions of the media content to an originating device, that is, the device where the watermark was added to the media content.

Referring now to the drawings, FIG. 1 illustrates a communication system 100 in accordance with one or more embodiments of the disclosure. For example, the communication system 100 may comprise a content server 102 and one or more user devices 104. The content server 102 communicate with the user device 104 over one or more networks 106.

In some embodiments, the content server 102 may be operable by and/or associated with one or more content providers. In some embodiments, a content provider may include a movie studio, a television studio, a content distributor, a website, a production studio, a record label, an independent artist, a news station, a radio station, an online streaming service, and/or any other provider of content. In some embodiments, the one or more content providers generate, distribute, and/or otherwise provide media content, which may include various types of media such as video content, audio content, textual content, pictorial content, plain text digital data, and/or the like.

The content server 102 may include any suitable processor-driven device including, but not limited to, a mainframe server, a hard drive, a desktop computing device, a laptop computing device, a router, a switch, a smartphone, a tablet, a wearable wireless device (e.g., a bracelet, a watch, glasses, a ring, an implant, and/or the like) and/or so forth. For example, the content server 102 may embody computing device 202 of FIG. 2.

In some embodiments, the content server 102 may include a secure enclave. For example, the secure enclave may be utilized by the content server 102 to receive, transmit, generate, format, store, encode, and/or decode media content. In some embodiments, the secure enclave of the content server 102 may be statically generated by securing a predetermined portion (e.g., an amount) of memory included in the content server 102. Alternatively, the secure enclave of the content server 102 may be dynamically generated by securing a portion (e.g., an amount) of memory included in the content server 102 greater than or equal to an amount of space required by the media content (e.g., based at least in part on a size or estimated size of the media content, a media content type, compression/formatting scheme, and/or the like). In some embodiments, the secure enclave of the content server 102 may embody a virtual server.

The user device 104 may be operable by and/or associated with one or more respective users (e.g., subscribers, viewers, customers, listeners, and/or the like) of media content and/or the content provider. For example, the user device 104 may be associated with subscribers of a financial news reporting website (e.g., the content provider) associated with the content server 102. In some embodiments, users of the user device 104 may enter and/or have entered an agreement with a content provider associated with the content server 102 to receive media content, where the media content is distributed by the content server 102 (and/or a secure enclave of the content server 102) to the user device 104 based at least in part on the agreement.

The user device(s) 104 may include any suitable processor-driven user device including, but not limited to, a desktop computing device, a laptop computing device, a server, a router, a switch, a smartphone, a tablet, wearable wireless device (e.g., bracelet, watch, glasses, ring, implant, etc.) and so forth. For example, the user device 104 may embody computing device 202 of FIG. 2.

In some embodiments, the user device 104 may include a secure enclave. For example, the secure enclave may be utilized by the user device 104 to receive, transmit, generate, format, sore, and/or encode, media content and/or other information associated with the media content (e.g., metadata), a user/user account of the user device 104 (e.g., account information, payment information, user preferences, subscription information, and/or the like), the user device 104 (e.g., device identification (ID) information, location information, and/or the like), and/or the like.

A secure enclave may be implemented in software and/or hardware to provide a trusted execution environment for the execution of software, which prevents software executing outside the secure enclave form having access to software and/or resources (e.g., components) inside the secure enclave. Accordingly, the software and resources inside the secure enclave are protected from attacks or unauthorized access. Example embodiments of secure enclaves are described in U.S. Pat. No. 9,097,200 entitled Method and Apparatus to Provide Secure Application Execution, filed Jun. 19, 2012. Other embodiments of secure enclaves are described in U.S. Pat. No. 8,832,452, entitled System and Method for Implementing a Trusted Dynamic Launch and Trusted Platform Module (TPM) Using Secure Enclaves, filed Dec. 22, 2010, as well as in PCT patent Application entitled Method and Apparatus for Providing Secure Application Execution, filed Dec. 22, 2009, Application No. PCT WO2011/078855.

In some embodiments, the secure enclave of the user device 104 may be statically generated by securing a predetermined portion (e.g., an amount) of memory included in the user device 104. Alternatively, the secure enclave of the user device 104 may be dynamically generated by securing a portion (e.g., an amount) of memory included in the user device 104 greater than or equal to an amount of space required by the media content (e.g., based at least in part on a size or estimated size of the media content, a media content type, compression/formatting scheme of the media content, and/or the like).

Further, the secure enclave of the user device 104 may include one or more firewalls to protect and/or separate any information, applications, and/or the like included in the secure enclave of the user device 104 from information, applications, hardware, software, and/or the like not included in the secure enclave of the user device 104. For example, one or more firewalls may deny all traffic into a secure enclave from portions (e.g., data, applications, processors, memory, and/or the like) of the user device 104 outside of the secure enclave. For example, an application (e.g., a media player) running and/or operated in a portion of the user device 104 separate from a secure enclave of the user device 104 may not be enabled to access information (e.g., media content) that is stored and/or processed by the secure enclave of the user device 104. In this manner, the secure enclave may serve as a secure, separate portion of the user device 104 so that any information (e.g., media content), applications, and/or the like being processed in the secure enclave may not be accessed from unauthorized parties outside of the secure enclave. In some embodiments, the secure enclave of the user device 104 may embody a virtual server.

Further, a secure enclave of the content server 102 and/or the user device 104 may define one or more priority levels. For example, a secure enclave may include a higher level of priority than a non-secure portion of the content server 102 and/or the user device 104. For example, the secure enclave may be enabled to utilize various resources of the user device 104 (e.g., an amount of memory, transceiver utilization, etc.) before other portions and/or processes outside of the secure enclave of the user device 104.

Any of the content servers 102 and/or the user device(s) 104 may be configured to communicate with each other and any other component of the communication system 100 via one or more communications networks (e.g., networks 106). Any of the communications networks 106 may include, but are not limited to, any one or a combination of different types of suitable communications networks such as, for example, broadcasting networks, cable networks, public networks (e.g., the Internet), private networks, wireless networks, cellular networks, or any other suitable private and/or public networks. Further, any of the communications networks 106 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 106 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The content server 102 may communicate with the user device 104 (e.g., data, media content, and/or other information types may be transmitted, retrieved, and/or received between the content server 102 and/or the user device 104). In some embodiments, the content server 102 may be configured to provide media content and associated information to user device 104 via wireless and/or wireline networks (e.g., the network(s) 106). The user device 104 may communicate user information, contact information, payment information, licensing information, media content information, and/or the like with the content server 102 via wirelessly wireline network(s) 106.

Figure 2:
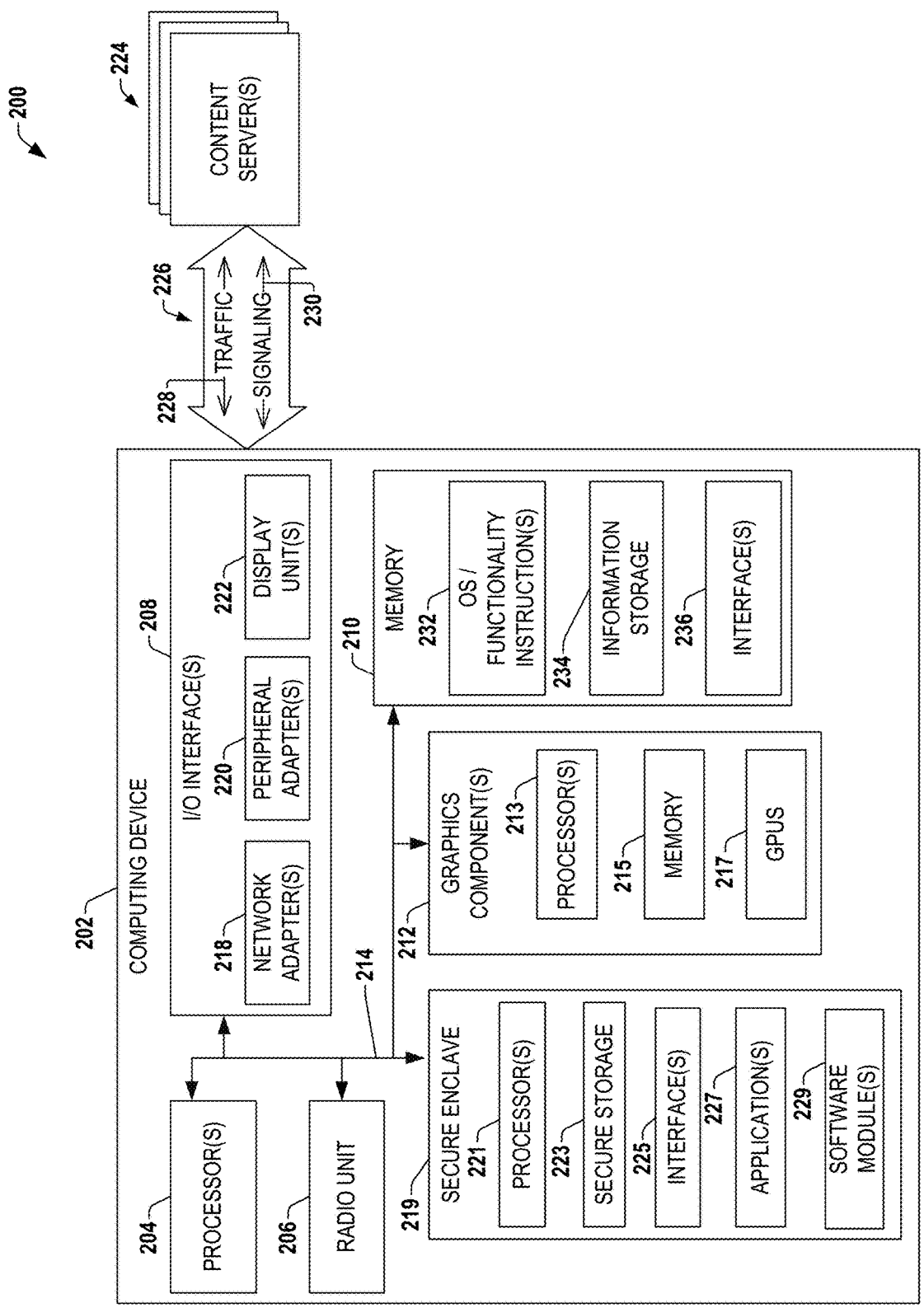
FIG. 2 depicts an example of a computational environment in accordance with one or more embodiments of the disclosure.

Referring now to FIG. 2, FIG. 2 illustrates an example of a computational environment 200, in accordance with one or more aspects of the disclosure. The example computational environment 200 is only illustrative and is not intended to suggest or otherwise convey any limitation as to the scope of use or functionality of such computational environments' architecture. In addition, the computational environment 200 should not be interpreted as having any dependency or requirement relating to any one or combination of components illustrated in this example computational environment. The illustrative computational environment 200 can embody or can include, for example, a computing device 202 (e.g., a content server 102 and/or a user device 104 of FIG. 1, and/or any other computing device that can implement or otherwise leverage the hardware secured media security features described herein).

The computational environment 200 represents an example of a software implementation of the various aspects or features of the disclosure in which the processing or execution of operations described in connection with hardware secured media security described herein, including processing of information communicated (e.g., encoded, modulated, and/or arranged) in accordance with this disclosure, can be performed in response to execution of one or more software components at the computing device 202. It should be appreciated that the one or more software components can render the computing device 202, or any other computing device that contains such components, a particular machine for hardware secured media security described herein, including processing of information encoded, modulated, and/or arranged in accordance with aspects described herein, among other functional purposes. A software component can be embodied in or can comprise one or more computer-accessible instructions (e.g., computer-readable and/or computer-executable instructions). At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 202 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 202 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with auto-detection, including processing of information communicated (e.g., encoded, modulated, and/or arranged) in accordance with features described herein, can comprise personal computers; server computers; laptop devices; handheld computing devices, such as mobile tablets; wearable computing devices; and/or multiprocessor systems. Additional examples can include set top boxes, programmable consumer electronics, network PCs, minicomputers, mainframe computers, blade computers, programmable logic controllers, distributed computing environments that comprise any of the above systems or devices, and/or the like.

As illustrated, the computing device 202 can comprise one or more processors 204, one or more radio units 20, one or more input/output (I/O) interfaces 208, a memory 210, graphics component(s) 212, a secure enclave 219, and a bus architecture 214 (also termed bus 214) that functionally couples various functional elements of the computing device 202. The bus 214 can include at least one of a system bus, a memory bus, an address bus, or a message bus, and can permit exchange of information (media content, associated information, data, metadata, and/or signaling) between the processor(s) 204, the one or more radio units 206, the I/O interface(s) 208, the memory 210, and/or the graphics component(s) 212 or respective functional element therein. In certain scenarios, the bus 214 in conjunction with one or more internal programming interfaces can permit such exchange of information. In scenarios in which processor(s) 204 include multiple processors and/or the computing device 202 includes multiple processors (e.g., processor(s) 204 and processor(s) 238), the computing device 202 can utilize parallel computing.

The I/O interface(s) 208 can permit or otherwise facilitate communication of information between the computing device 202 and an external device, such as a content server 224 (e.g., a network element, content server 102, another user device 104, and/or the like). Such communication can include direct communication or indirect communication, such as exchange of information between the computing device 202 and an external device via a network (e.g., network 106 of FIG. 1) or elements thereof. As illustrated, the I/O interface(s) 208 can comprise one or more of network adapter(s) 218, peripheral adapter(s) 220, and display unit(s) 222. Such adapter(s) can permit or facilitate connectivity between the external device and one or more of the processor(s) 204 or the memory 210. In one aspect, at least one of the network adapter(s) 218 can couple functionally the computing device 202 to content server 224 (e.g., the content server 102 of FIG. 1, and/or the like) via one or more traffic and signaling pipes 226 that can permit or facilitate exchange of traffic 228 and signaling 230 between the computing device 202 and the content server 224. Such network coupling provided at least in part by the at least one of the network adapter(s) 218 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each user device 104 of FIG. 1 can have substantially the same architecture as the computing device 202. In addition or in the alternative, the display unit(s) 222 can include functional elements (e.g., lights, such as light-emitting diodes; a display, such as liquid crystal display (LCD), combinations thereof, or the like) that can permit control of the operation of the computing device 202, or can permit conveying or revealing operational conditions of the computing device 202.

In one aspect, the bus 214 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 214, and all buses described herein can be implemented over a wired or wireless network connection and each of the subsystems, including the processor(s) 204, the radio unit 206, the I/O interface(s) 208, the memory 210 and memory elements therein, and/or the secure enclave can be contained within one or more computing devices 202 (e.g., user devices 104 of FIG. 1) and/or content server 224 (e.g., content servers 102 of FIG. 1) at physically separate locations, connected through buses of this form, in effect implementing a fully distributed system.

The computing device 202 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 202, and can comprise, for example, both volatile and non-volatile media, and removable and/or non-removable media. In one aspect, the memory 210 can comprise computer-readable media in the form of volatile memory, such as random access memory (RAM), and/or non-volatile memory, such as read only memory (ROM).

The memory 210 can comprise computer-accessible instructions and information (e.g., data and/or metadata) that permit or facilitate operation and/or administration (e.g., upgrades, software installation, any other configuration, or the like) of the computing device 202. Accordingly, as illustrated, the memory 210 can comprise a memory element 232 (labeled OS/functionality instruction(s) 232) that contains one or more program modules that embody or include one or more operating systems (OSs), such as Windows operating system, Unix, Linux, Symbian, Android, Chromium, and substantially any OS suitable for mobile computing devices or tethered computing devices. In one aspect, the operational and/or architecture complexity of the computing device 232 can dictate a suitable OS. The memory 210 also comprises a system information storage 234 having data and/or metadata that permits or facilitate operation and/or administration of the computing device 202. Elements of the OS/functionality instruction(s) 232 and the system information storage 234 can be accessible or can be operated on by at least one of the processor(s) 204.

It should be recognized that while the functionality instructions storage 234 and other executable program components, such as the operating system instruction(s) 232, are illustrated herein as discrete blocks, such software components can reside at various times in different memory components of the computing device 202, and can be executed by at least one of the processor(s) 204. In certain scenarios, an implementation of operations associated with the graphics component(s) 212 can be retained on or transmitted across some form of computer readable media.

The OS/functionality instruction(s) 232 can also comprise functionality instructions. Functionality instructions can comprise computer-accessible instructions that, in response to execution (by at least one of the processor(s) 204), can implement one or more of the functionalities of the disclosure. The computer-accessible instructions can embody or can comprise one or more software components and/or functionalities associated with the graphics component(s) 212. Further, information storage 234 may include functionality information storage, which may be utilized to implement one or more functions disclosed herein.

For instance, such execution can cause a processor that executes the at least one component to carry out a disclosed example method. It should be appreciated that, in one aspect, a processor of the processor(s) 204 and/or GPUs 217 that executes at least one of the functionalities and/or implements a method disclosed here can retrieve information from and/or retain information in information storage 234 in accordance with the functionality programmed or otherwise configured by the methods and/or systems disclosed herein. Such information can include at least one of code instructions, information structures, or the like. At least one of the one or more interfaces 236 (e.g., application programming interface(s)) can permit or facilitate communication of information between two or more components within the functionality instructions storage 234. The information that is communicated by the at least one interface can result from implementation of one or more operations in a method of the disclosure. In certain embodiments, one or more of the functionality instructions storage 234 can be embodied in or can comprise removable/non-removable, and/or volatile/non-volatile computer storage media.

It should be appreciated that, in certain scenarios, the information instruction(s) storage 234 can embody or can comprise a computer-readable non-transitory storage medium having computer-accessible instructions that, in response to execution, cause at least one processor (e.g., one or more of processor(s) 204) to perform a group of operations comprising the operations or blocks described in connection with the disclosed methods.

In some embodiments, the graphics component(s) 212 may embody a graphics card and/or similar component configured to render media (e.g., video, audio, and/or the like). The graphics component(s) 212 may receive media content and a decryption key from the secure enclave 219 and/or other portion of the computing device 202, decrypt the media content using the decryption key, render the decrypted media content, and then transmit the rendered decrypted media content to one or more display unit(s) 222 and/or other interface components for viewing, listening, playing, and/or the like. The graphics component(s) 212 may include one or more processors 213, memory 215, and/or one or more GPUs 217. The graphics component(s) 212 may be directly coupled (e.g., via hardware) to the secure enclave 219 and/or various output components (e.g., interface(s) 208) for displaying rendered media content. In some embodiments, the one or more processors 213, the memory 215, and/or the one or more GPUs 217 of the graphics component(s) may be utilized by the secure enclave 219 to perform various operations disclosed herein. For example, the secure enclave 219 may transmit media content to the graphics component(s) 212 (e.g., the GPU(s) 217) for decryption and/or rendering.

The secure enclave 219 may include a hardware-specific element(s) of the computing device 202 that is separate and distinct from other elements of the computing device 202. For example, the secure enclave 219 may include various hardware elements such as one or more processors 221, secure storage 223, one or more interfaces 225, one or more applications 227, one or more software modules 229, and/or the like that may only be controlled and/or operated by elements included in the secure enclave 219. In this manner, no unauthorized software (e.g., OS/functionality instructions 232) that is executed by the processor(s) 204 of the computing device 202 may breach and/or affect execution of software module(s) 229 by the processor(s) 221 of the secure enclave 219. In some embodiments, the secure enclave 219 may operate in a similar manner as a virtual machine stored within the computing device 202. For example, the secure enclave 219 may exist as a virtual instance of the processor(s) 204, radio unit 206, I/O interface(s) 208, and/or memory 210. Resources of the computing device 202 (e.g., portions of the processor(s) 204, radio unit 206, I/O interface(s) 208, and/or memory 210) may be dynamically and/or virtually partitioned to form the secure enclave 219.

In some embodiments, the secure enclave 219 may be included in the memory 210. For example, the secure enclave 219 may be a statically- and/or dynamically-allocated portion of the memory 210 and/or the computing device 202. In other embodiments, the secure enclave 219 may exist separately from memory 210 as standalone hardware with various elements and/or components of a computing device. In some embodiments, the secure enclave 219 may be coupled to and/or included with a graphics processor (e.g., graphics component(s) 212) and/or other media renderer so that media content and/or other information processed by the secure enclave 219 may not be transmitted outside the secure enclave 219 for processing by any other software and/or hardware element running on the computing device 202. In this manner, media content received by the secure enclave 219 (and/or the computing device 202) may be secured from applications (e.g., software and/or hardware) outside of the secure enclave 219.

In some embodiments, the processor(s) 221 may operate independently from the processor(s) 204. The processor(s) 221 may execute the one or more software module(s) 229, which may include OS and/or functionality instructions for programming, configuring, and/or operating at least in accordance with the functionality disclosed herein. One or more of the processor(s) 221 can execute at least one of such instructions and leverage at least a portion of the information in the secure storage 223 in order to provide secure media transmission and/or media playing in accordance with one or more aspects described herein. More specifically, yet not exclusively, execution of one or more of the software module(s) 229 can permit transmitting and/or receiving information at the secure enclave 219 and/or the computing device 202, where the at least a portion of the information includes one or more media signals and/or streams of data as described in connection with FIGS. 1, 3, and 4, for example. The processor(s) 221 may further facilitate the encoding and/or decoding, multiplexing, and/or the like of various signals. For example, the processor(s) 221 of the secure enclave 219 may be enabled to decrypt encrypted media content received from the content server(s) 224. Further, once the processor(s) 221 of the secure enclave 219 have decrypted the encrypted media content (to thereby result in decrypted media content), the processor(s) 221 may be enabled to encrypt and/or encode the decrypted media content for prior to transmission of the media content to one or more GPUs 217 of the graphics component(s) 212. The processor(s) 221 may also be enabled to generate one or more decryption keys for use by the GPUs 217 when decrypting the media content received from the secure enclave 219. Additionally, the secure enclave 219 may include one or more radio units and/or transceivers. In some embodiments, the secure enclave 219 may communicate directly with the content server(s) 224 over a secure network connection. For example, the secure enclave 219 may communicate directly with a second secure enclave associated with the content server 224 to receive and/or transmit media signals and/or the like as described herein.

Secure storage 223 may be used by the secure enclave to store various pieces of information such as encryption and/or decryption information, user information, account information, license information, media signal information, software instructions and/or modules (229), drivers for a media player and/or other applications (227), and/or the like. The secure storage 223 may enable the processor(s) 221 to receive, retrieve, transmit, modify, and/or the like any information stored within the secure storage 223 as described herein.

The application(s) 227 of the secure enclave 219 may include various applications that enable functionality disclosed herein. For example, the application(s) 227 may include a media player application native to the secure enclave 219. Alternatively, the secure enclave 219 may utilize a media player application stored and/or utilized by other elements of the computing device 202 to display and/or play, for example, a video, audio, and/or another type of file and/or signal. Other exemplary applications included in the application(s) 227 may include a payment processing application and a license application to executing a secure payment with the content server for media content, a user authorization application for authenticating the user/user account with the content server, an encoding/decoding application, a location application, a device identification application that identifies the platform/device and/or user/user account as well as other information that may be used to generate a a unique identification that may be utilized by a watermark application, also included in the applications 227, to add a watermark to the media content, and/or the like. These applications may facilitate operation of one or more functionalities described herein. Alternatively, the secure enclave 219 may utilize various applications of the computing device 202, such as those governed by memory 210.

The interface(s) 225 of the secure enclave 219 may include the I/O interface(s) 208 or similar interfaces and/or components (e.g., display unit(s) 222). In some embodiments, the interface(s) 225 are utilized to, for example, display video and/or emit/receive audio signals as described herein. Additionally, the interface(s) 225 may facilitate the transmission of media content to the display unit(s) 222 for display, playing, viewing, and/or the like. By including interface(s) 225, a media player application (e.g., application(s) 227), and/or a display unit (e.g., display unit 222)) in and/or executable by the secure enclave 219, a secure, non-breachable, connection may be ensured for a media signal and/or media content to be received, decoded, played, and/or viewed by the computing device 202. Therefore, software and/or hardware controlled by the computing device 202 and/or a user that is located and/or stored outside of the secure enclave 219 may not affect operations of and/or information stored in the secure enclave 219. In some embodiments, the secure enclave 219 may communicate directly with the display units 222 and/or other components of the I/O interface(s) 208 of the computing device 202 for displaying, for example, video, audio, and/or the like.

Further, the interface(s) 225 of the secure enclave 219 may include a manageability engine that is used to facilitate the transfer of information (e.g., media content, encryption and/or decryption information, operation instructions, and/or the like) between the secure enclave 219 and the graphics component(s) 212 (e.g., the GPUs 217). For example, the manageability engine may facilitate transmission of media content, one or more decryption keys for decrypting the media content, and instructions to render the media content from the secure enclave 219 to the GPUs 217. The GPUs 217 may then receive, decrypt, and render the media content. In some embodiments, the manageability engine may run and/or operate within one or more processor(s) 221 of the secure enclave 219, one or more processor(s) 204 of the computing device 202, and/or one or more processor(s) 213 and/or GPUs 217 of the graphics component(s) 212. In some embodiments, a secure sockets layer (SSL) component and/or a codec component of the secure enclave may perform one or more decryption and/or encryption processes disclosed herein. The codec components of the secure enclave may also, in some embodiments, splice (e.g., divide) media content into smaller portions (e.g., frames, buffers, and/or the like) which may be then individually transmitted, received, encoded, decoded, encrypted, and/or decrypted by the secure enclave and/or the GPUs. In some embodiments, the media content may refer to frames and/or buffers of media content.

The software modules 229 of the secure enclave 219 may include instructions for one or more operations disclosed herein. In some embodiments, the software module(s) 246 are executed by the processor(s) 221 of the secure enclave 219. Software module(s) 229 may be associated with one or more application(s) 227, such as a media player application, that, when executed by the processor(s) 221, initiates playing of a video using the interface(s) 225, for example.

In some embodiments, the secure enclave 219 may be controlled and/or operated based on input from a separate computing device (e.g., content servers 224). In this manner, a user of the computing device 202 (including the secure enclave 219) may or may not be enabled to control and/or operate the secure enclave 219. Therefore, the secure enclave 219 may not be affected by any user input and/or locally-stored hardware and/or software. Alternatively, a local user, locally-installed software, and/or local hardware may have access to information stored within the secure enclave 219, may control the secure enclave 219, and/or the like. For example, validation of user credentials of a local user may be required for the local user to access and/or control the secure enclave 219. In some embodiments, the secure enclave 219 may include one or more firewalls for protecting one or more elements and/or information of the secure enclave 219. Various elements of the secure enclave 219 may also be enabled to communicate with other elements of the computing device 202.

The computing device 202 can include a power supply (not shown), which can power up components or functional elements within such devices. The power supply can be a rechargeable power supply, e.g., a rechargeable battery, and it can include one or more transformers to achieve a power level suitable for operation of the computing device 202 and/or one of the computing device(s) 224, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 218) to connect operationally to the conventional power grid. In another aspect, the power supply can include an energy conversion component, such as a solar panel, to provide additional or alternative power resources or autonomy for the computing device 202.

The computing device 202 can operate in a networked environment by utilizing connections to content server 224 and/or other remote computing devices. As an illustration, a remote computing device can be a personal computer, a portable computer, a server, a router, a network computer, a peer device or other common network node, and so on. As described herein, connections (physical and/or logical) between the computing device 202 and a computing device of the content server 224 and/or remote computing devices can be made via one or more traffic and signaling pipes 226, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 3:
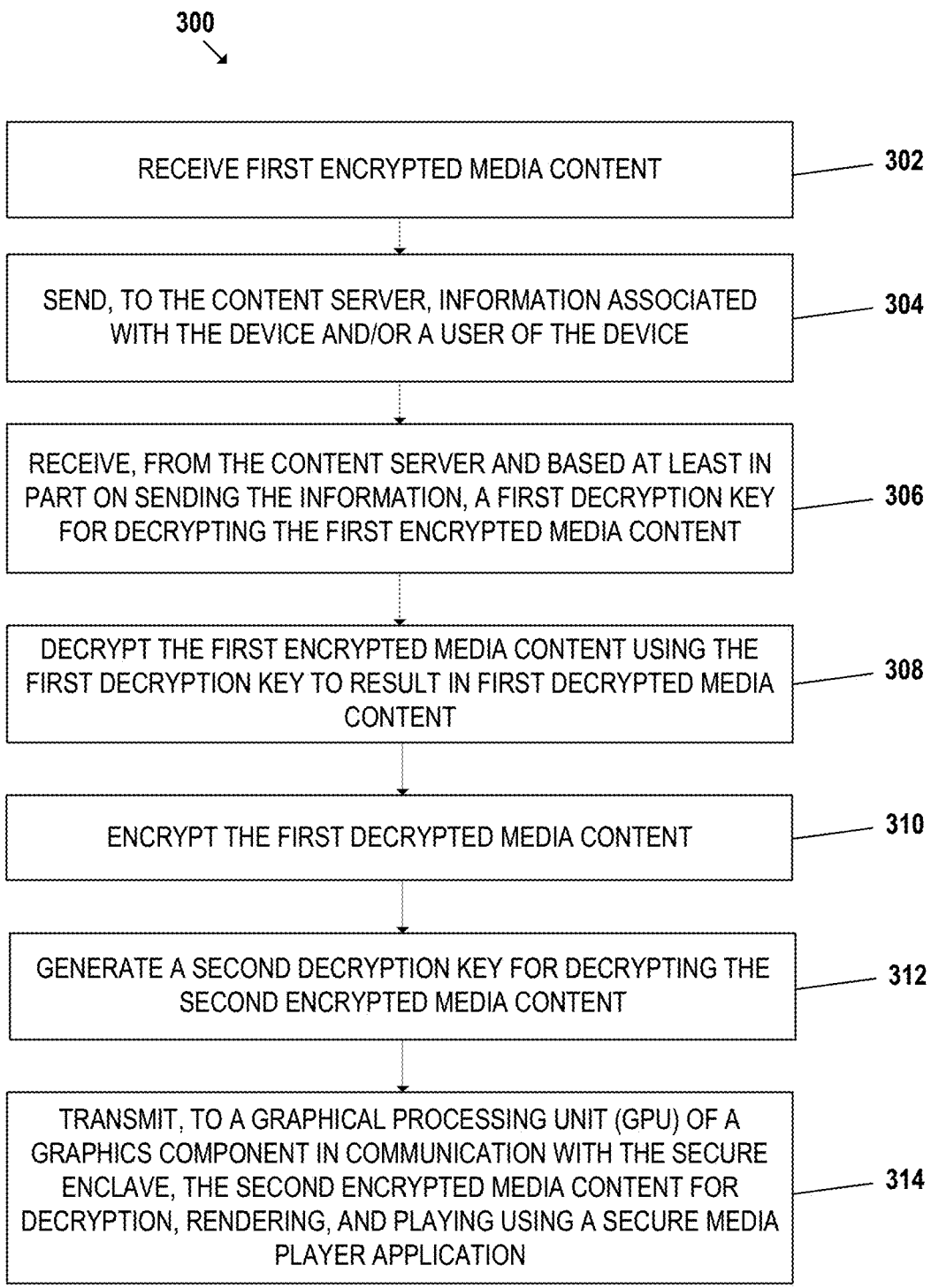
FIG. 3 depicts an example process flow for decrypting and playing encrypted media content using a secure media player application, in accordance with one or more embodiments of the disclosure.

Referring now to FIG. 3, depicted is an example method 300 for decrypting and playing encrypted media content, such as a video, with a secure media player application, such as between the content server 102 (e.g., a content server 224 of FIG. 2) and a user device 104 in FIG. 1 (e.g., computing device 202 of FIG. 2), in accordance with one or more embodiments of the disclosure. At block 302, the method 300 includes receiving, at a secure enclave of a user device 104 and from a content server 102, encrypted media content. Encrypted media content may include any type of media-based content such as video content, pictorial content, audio content, and/or the like. The encrypted media content may also include secure payment and/or license information to enable the secure payment and processing of the media content for delivery. In some embodiments, the encrypted media content may be received as a singular file and/or frame. In other embodiments, the encrypted media content may be received as a plurality of data packets and/or files, a stream of data packets, and/or the like. The encrypted media content may be purposed for viewing, listening, consumption, and/or the like by a user of the user device 104.

In some embodiments, the encrypted media content may transmitted from the content server 102 to the user device 104 based on a predetermined relationship and/or an agreement held between the content server 102 (and/or a service provider or content provider associated with the content server 102) and the user of the user device 104 (e.g., a subscriber, a customer, a listener, a viewer, and/or the like). The user device 104 and/or the user device may be identified by the content server 102 as a destination device for the encrypted media content based on information associated with the user of the user device 104 and/or the user device 104 (e.g., a device ID), a previous transmission to the user device 104, and/or the like.

In some embodiments, receiving encrypted media content may include establishing a secure communication connection between the content server 102 and the user device 104 as described herein prior to, concurrently with, and/or after receiving the media content. The content server 102 may therefore transmit the encrypted media content and/or other transmissions to the user device 104 using the secure communication connection. For example, the content server 102 may establish a secure communication connection with a secure enclave of the user device 104. Alternatively, if the content server includes a secure enclave, a secure communication connection may be established between the secure enclave of the content server 102 and the secure enclave of the user device 104. In some embodiments, establishing a secure communication connection between the content server 102 and the user device 104 may include establishing a virtual private network (VPN) communication connection. Utilizing a VPN communication connection may ensure that transmissions transmitted between the content server 102 and the user device 104 are secure.

By utilizing a secure communication connection between the content server 102 (and/or a secure enclave of the content server) and the secure enclave of the user device 104, the secure enclave of the user device 104 may be controlled, operated, and/or the like by an operator associated with the content server 102. For example, control information such as memory allocation information, processing speeds, operating instructions, and/or the like of components included in the secure enclave of the user device 104 may be received at the secure enclave of the user device 104 from the content server 102 over the established secure communication connection. In some embodiments, if the secure enclave of the user device 104 and/or its associated components are being controlled by the content server 102, the secure enclave of the user device 104 may not be accessible, controllable, and/or operable to/by any software, hardware, and/or users associated with and/or local to the user device 104. Alternatively, the secure enclave of the user device 104 and/or its associated components may be accessed, controlled, and/or operated by any software, hardware, and/or users of the user device 104. For example, a user of the user device 104 may be required to provide authentication credentials, which are authenticated by the secure enclave of the user device 104. Upon successful authentication, the user of the user device 104 may then be enabled to access, modify, control, and/or operate the secure enclave and/or its associated components.

In some embodiments, upon receipt of the encrypted media content, the user device 104 may determine that the encrypted media content is intended for the secure enclave of the user device 104. For example, with reference to FIG. 2, the signaling 230 and or operation of the I/O interfaces 208 may determine that a secure communication connection or session is being establish for the secure enclave 219 or that the received content is addressed or otherwise indicated as intended for the secure enclave 219. Further, the user device 104 (e.g., the I/O interfaces 208) may transmit the encrypted media content received at device 104 to the secure enclave (e.g., secure enclave 219 of FIG. 2) of the user device 104 for processing by its processors and/or its GPUs.

As described herein, the secure enclave (e.g., secure enclave 219) of the user device 104 may be directly coupled (e.g., via hardware) to a graphical processing unit (GPU) (e.g., GPUs 217 of graphics component(s) 212) or other media renderer of the user device 104. In some embodiments, the GPU may be included in a graphics card or similar component and may be dedicated to executing operations associated with the secure enclave. By utilizing a GPU directly coupled (e.g., via hardware) with the secure enclave of the user device 104, any media content and/or information received at the secure enclave of the user device 104 may be protected from unwanted exposure to other software and/or hardware elements of the user device 104. For example, the secure enclave of the user device 104 may be protected by one or more firewalls and/or include hardware components that are separate and/or isolated from other hardware components of the user device 104 to prevent undesired access from outside the secure enclave. Further, the secure enclave may be secured based on one or more privilege hierarchies associated with particular configuration and/or execution modes. For example, access to the secure enclave may require a higher privilege level than access to memory 210 of the computing device 202, for example.

Once received at the secure enclave of the user device 104, the media content may be decrypted by the secure enclave. In some embodiments, the secure enclave may use a decryption key to decrypt the media content. The decryption key may be transmitted by the content server to the secure enclave. Once decrypted, the secure enclave may then prepare the media content for transmission to the GPUs of the graphics component for rendering. Preparing the media content may include encrypting the media content for security purposes. The secure enclave may also generate a second decryption key for use by the GPUs of the graphics component to decrypt the media content.

Accordingly, the secure enclave may then transmit the media content (e.g., decrypted and/or encrypted media content and a second decryption key) to a GPU of a graphics component (e.g., a graphics card or other media render) for processing. For example, the secure enclave may transmit encrypted media content to one or more GPUs for decryption using the second decryption key and rendering. The GPUs may then, upon rendering, transmit the media content to one or more output devices (e.g., displays, speakers, and/or the like) for viewing, listening, and/or the like. In this manner, the media content may be secured and/or protected from processes occurring outside the secure enclave and/or graphics component of the user device 104, thereby reducing exposure to software and/or hardware outside of the secure enclave and increasing security of the media content. Alternatively, the secure enclave may execute the encryption and/or decryption processes described herein, and may simply transmit decrypted media content to the GPUs for rendering and/or display without encrypting the media content.

The user device 104 may receive, via the established secure communication connection, from the content server 102, and in response to establishing the secure communication connection, an information request. In some embodiments, the information request may include a request for payment information (e.g., account information, personal information, banking information, a card number, an account number, a routing number, an amount, and/or the like), licensing information (e.g., a license number, a subscription number or identification (ID)), and/or the like from one or more authorized users (e.g., subscribers, viewers, and/or the like) associated with the user device 104. For example, the information request may request a license number for receiving and/or viewing media content to be used to verify that the user of the user device 104 is indeed authorized to view and/or consume the encrypted media content. In some embodiments the information request may be encoded, and therefore may be decoded by the user device 104 upon receipt. In some embodiments, the information request may be decoded by the user device 104 using the secure enclave and/or the GPUs included in the graphics component(s).

At block 304, the user device 104 may provide and/or otherwise transmit the requested information (e.g., information requested in the information request such as user information, licensing information, and/or the like) to the content server 102. For example, user authentication credentials of a user of the user device 104 and/or platform identification information (e.g., MAC address of the network card of the device 104, a secure enclave identifier, geographical location information such as an IP address, etc.) may be transmitted, along with a credit card number, using the secure enclave of the user device 104, to the content server 102 for authentication, validation, processing, and/or the like. In some embodiments, information requested by the information request, such as payment information, licensing information, and/or the like may be stored in and/or retrieved from memory of the secure enclave of the user device 104. In some embodiments, the secure enclave of the user device 104 may encrypt information prior to transmitting the information to the content server. In fact, any transmission transmitted and/or received by the content server 102 and/or the user device 104 (and/or the secure enclave of the user device 104) may be encoded and/or decoded. In some embodiments, the information requested in the media content request is transmitted to the content server 102 for authentication, validation, and/or the like by the content server 102 and/or a third party. In some embodiments, the content server may insert a watermark into the content prior to sending the encrypted content to the user device 104 to uniquely identify that copy as being consumed by the specific device 104 and/or user/user account.

In addition to transmitting requested information at block 304, the user device 104 may also transmit a request for encryption and/or decryption information to the content server 102. The encryption and/or decryption information may include information associated with encrypting and/or decrypting the encrypted media content, such as a decryption key. In some embodiments, the decryption key may include a first decryption key and a second decryption key, where the first decryption key is used by the secure enclave, and where the second decryption key is used by the GPUs of the graphics components. The user device 104 may use the encryption and/or decryption information to decrypt the encrypted media content and/or any transmissions received from the content server 102. For example, the content server 102 and/or the user device 104 may utilize encryption and/or decryption information to encrypt, decrypt, encode, and/or decode information, media content, various transmissions, and/or the like. In some embodiments, the encryption and/or decryption information in included in a transmission including the media content. For example, the encryption and/or decryption information may be included in the same transmission as the media content, so that when the user device 104 receives the media content, the user device 104 also receives the encryption and/or decryption information. Further, the media content may be streamed continuously and/or in bursts. As such, the user device 104 may receive multiple pieces of encryption and/or decryption information during a stream of media content. For example, multiple different modes of encryption may be utilized to encrypt the media content, so the user device 104 may receive and/or utilize one or more different decryption keys to decrypt the encrypted media content at various times.

Upon receipt of the information (e.g., payment information, user information, license information, and/or the like) requested by the information request, the content server 102 may authenticate, validate, and/or otherwise process the information. In some embodiments, processing the information includes verifying, authenticating, validating, confirming, and/or the like. For example, user authentication credentials may be processed by the content server 102 to ensure that the user device 104 (and/or the user associated with the user device 104) is authenticated for receiving the media content. As another example, a credit card number may be processed and a payment transaction may be executed as payment in exchange for access to the encrypted media content.

In response to the content server 102 processing the information, the content server 102 may determine that the user device 104 and/or the user associated with the user device 104 is indeed authorized to consume (e.g., view, listen to, and/or the like) the encrypted media content. Accordingly, the content server 102 may transmit to the user device 104 (e.g., the secure enclave of the user device 104) decryption information, such as the decryption key(s) used for decrypting the encrypted media content, to the user device 104. In some embodiments, the key may be valid only for a predetermined amount of time, a time of day, a number of views and/or listens, a set of authorized user devices 104, and/or the like.

In some embodiments, requesting encryption and/or decryption information from the content server 102 includes retrieving encryption and/or decryption information from the content server 102. In some embodiments, encryption and/or decryption information from the content server 102 may include a key used for encrypting, decrypting, encoding, and/or decoding various pieces of information (e.g., media content, and/or the like).

Accordingly, at block 306, the user device 104 (e.g., the secure enclave of the user device 104) may receive the decryption information (e.g., the decryption key(s) for decrypting the encrypted media content) from the content server 102.

At block 308, the user device 104 (e.g., the secure enclave of the user device 104) may use the decryption information (e.g., the first decryption key) to decrypt and/or decode the encrypted media content. Decryption of the encrypted media content may result in generation of decrypted media content.

Once the encrypted media content is decrypted by the secure enclave of the user device 104, the decrypted media content is ready to be played, viewed, listened to, and/or otherwise interacted with or consumed by the user associated with the user device 104. In some embodiments, the user device 104 may determine whether a secure media player exists within (e.g., is stored as an application within) the secure enclave of the user device 104. By utilizing a secure media player that exists within the secure enclave of the user device 104 to play the decrypted media content, the user device 104 may not be required to utilize any hardware and/or software outside of the secure enclave to play the decrypted media content. In this manner, it may be ensured that the media content is securedly viewed by authorized user of the user device 104 only.

In some embodiments, the secure media player may include a media player that runs and/or operates (e.g., is stored, and/or the like) inside or as a part of the secure enclave of the user device 104. The secure media player may utilize one or more GPUs of a graphics component of the user device 104 accessed by the secure enclave of the user device 104 to decrypt, render, and/or play the media content. These GPUs, which may be included in a graphics component such as a graphics card or renderer, may be directly coupled (e.g., via hardware) to the secure enclave. Utilizing a GPU that is directly coupled to the secure enclave to render and/or play the decrypted media content via the secure media player application enables the decrypted media content to be played securely without exposing the decrypted media content to any processes, software, and/or hardware that exists outside the secure enclave of the user device 104.

At block 310, the secure enclave may encrypt the decrypted media content in preparation of transmitting the media content outside of the secure enclave and to the GPUs of the graphics component. For example, the secure enclave, using a manageability engine as described above, may encrypt the media content, generate a second decryption key to be used by the GPUs for decrypting the media content (e.g., see block 312), and transmit the media content and the decryption information (e.g., the second decryption key) to one or more GPUs of the graphics component for processing (e.g., see block 314). In this manner, the GPUs may be enabled to decrypt the media content using the second decryption key and then render the media content for subsequent playing and/or display.

Further at block 314, if a secure media player is indeed available (e.g., stored as an application in the secure enclave of the user device 104, and/or the like) for playing the media content, then the user device 104 may facilitate play of the decrypted media content using the secure media player included in the secure enclave of the user device 104. In some embodiments, playing the decrypted media content may include rendering the decrypted media content using a GPU included within a graphics component directly coupled to the secure enclave of the user device 104. For example, the GPUs may utilize a secure media player application and/or manageability engine of the secure enclave to facilitate play and/or viewing of the media content. The GPUs may further transmit the decrypted media content directly to an output device (e.g., a display, a monitor, a speaker, and/or the like) for playing of the media content. As such, the integrity and security of the decrypted media content may be dramatically improved.

Figure 4:
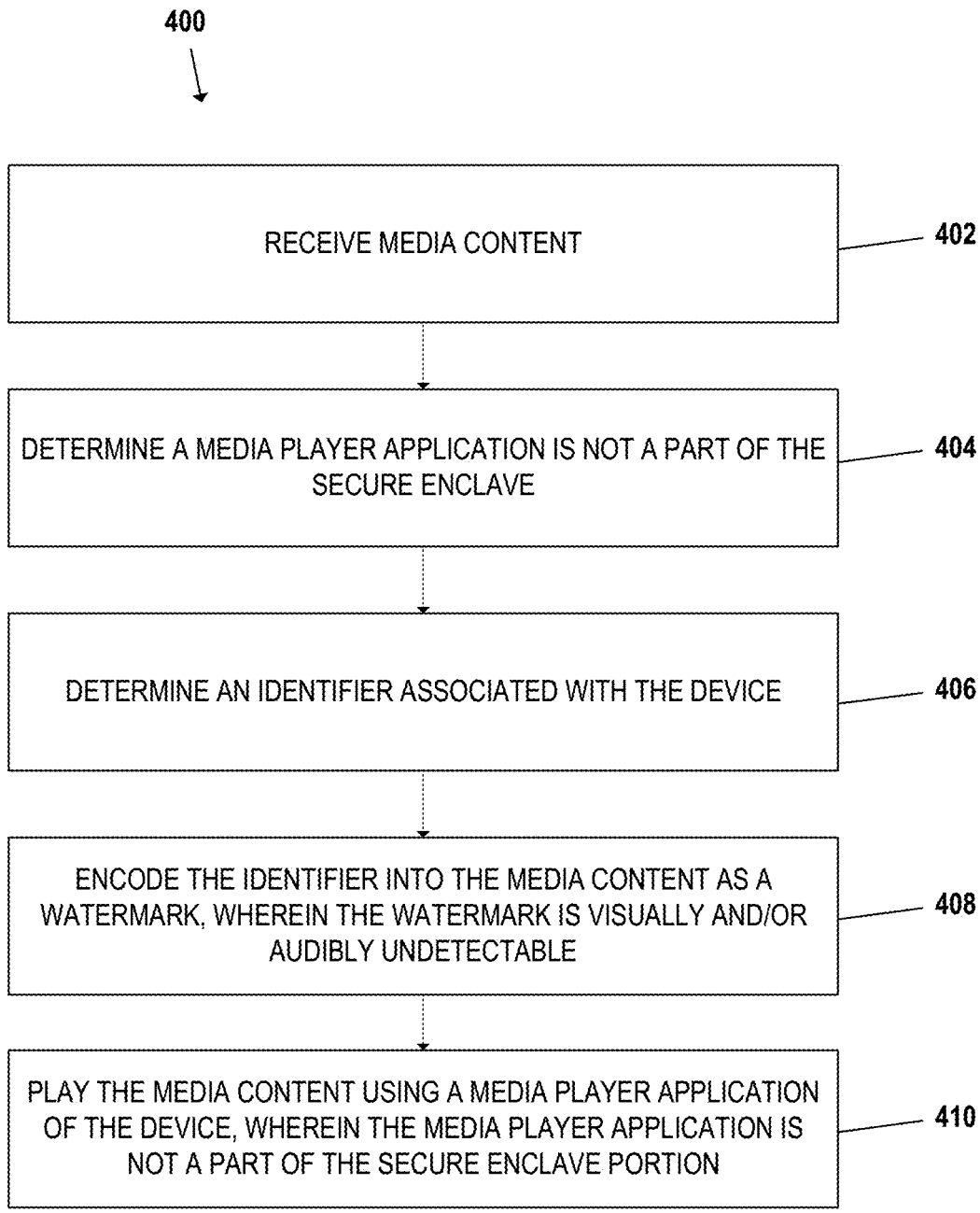
FIG. 4 depicts an example process flow for embedding a device identifier into media content as a watermark when a secure media player is not available, in accordance with one or more embodiments of the disclosure.

Referring now to FIG. 4, FIG. 4 illustrates an exemplary method 400 for embedding a identifier associated with the platform (e.g., the device and/or secure enclave) and/or the user/user account into the media content, such as a video, as a watermark when a secure media player is not available. Following the method 300 of FIG. 3, the method 400 may include a first step at block 402 of receiving and processing the media content, (e.g., second decrypted media content, or media content that has been decrypted using the second decryption key and/or rendered by the GPU). Similar to blocks 304-308 of method 300 in FIG. 3, the processing of block 402 may include processing the encrypted media content and obtaining an encrypted key to the media content, such as from a content server.

At block 404, if the user device 104 and/or the secure enclave determines that no secure media player is available in the secure enclave of the user device 104, then the user device 104 may determine to use a media player not included in the secure enclave of the user device 104 (e.g., an unsecure media player). However, using a media player not included in the secure enclave of the user device 104 (e.g., an unsecure media player) may involve transmitting the decrypted media content outside of the secure enclave of the user device 104, and thus, may expose the decrypted media content to potential security risks. Therefore, prior to playing the decrypted media content using a media player not included in the secure enclave of the user device 104, the user device 104 may perform a series of steps described herein to ensure that the decrypted media content is well-protected and secure. In some embodiments, the GPU may transmit the decrypted media content back to the secure enclave for processing. Alternatively, the GPU may perform the sequence of steps described herein.

At block 406, for example, the user device 104 and/or the secure enclave may generate, collect, retrieve, and/or otherwise determine a platform identity (e.g., identifier) associated with the user device 104. Alternatively, the identifier may include user/user account information. In some embodiments, the platform identity may include an identification number (e.g., a serial number) associated with the user device 104, the secure enclave(s) of the user device 104, a media access control (MAC) address associated with a user device 104 and/or a network card utilized for transmission of the media content, location information (e.g., global positioning system (GPS) coordinates, an Internet Protocol (IP) address, and/or the like) of the user device 104, payment information, license information, account information, contact information, user history information, and/or the like of the user and/or operator of the user device 104, and/or the like. In some embodiments, the platform identity may be generated by the secure enclave of the user device 104. In other embodiments, the platform identity may be generated by and/or provided by the content server 102.

At block 408, once generated, collected, retrieved, and/or otherwise determined by the user device 104 and/or the secure enclave, the platform identity may be encoded into the decrypted media content by the user device 104 (e.g., by the secure enclave of the user device 104) as a watermark. For example, a watermark may be encoded into the decrypted media content by the secure enclave of the user device 104. In this manner, any unauthorized redistributions of the decrypted media content may contain a watermark of an encoded platform identity of the user device 104. Identification of the watermark may allow authorities, content providers, and/or the like to more accurately trace, track, and/or otherwise identify the user device 104 from which the media content was stolen, redistributed, shared, and/or the like without authorization and/or consent from the content provider(s). For example, if the decrypted media content is ripped (e.g., videotaped, copied, recorded, captured, and/or the like) by a second device, the ripped media content may include the watermark, which allows ripped encrypted media content to be traced to a user device 104 from which the media content was ripped (e.g., the user device 104 on which the media content was originally played).

In some embodiments, various methods of encoding may be utilized by the user device 104. For example, the user device 104 may utilize video encoded invisible light (VEIL) to encode the platform identity into decrypted video content as a watermark. Utilizing VEIL or similar encoding techniques may enable the watermark to withstand multiple re-encodings, decodings, digital-to-analog and/or analog-to-digital conversions, various format conversions, and/or the like. In some embodiments, the platform identity is encoded into the decrypted media content as a watermark at a relatively low predetermined bit rate so that the watermark is substantially undetectable by human inspection (e.g., visual and/or audial inspection). In some embodiments, the watermark may be an audio watermark, a visual watermark, a text-based watermark, a mathematical watermark, and/or the like. In some embodiments, the watermark may be imperceptible to humans, either visually and/or audibly. Further, in some embodiments, encoding the platform identity of the user device 104 into the decrypted media content results in generation of watermarked media content.

At block 410, after the platform identity has been encoded as a watermark into the decrypted media content by the user device 104, the watermarked media content may be played by a media player not included in the secure enclave of the user device 104. For example, the secure enclave of the user device 104 may transmit the watermarked media content to a media player application stored outside the secure enclave of the user device 104 for playing. Alternatively, the secure enclave may transmit the watermarked media content to the GPU of the graphics component for decryption and/or rendering as disclosed above. The GPU may then transmit, upon rendering, the media content to an unsecure media player application for facilitation of playing and/or viewing the media content via one or more output devices (e.g., displays).

In some embodiments, the user device 104 may transmit a message, an alert, a notification, an indication, and/or a like to the content server 102 notifying the content server 102 that the media content has been played. The user device 104 may further transmit the platform identity encoded into the decrypted media content (e.g., the watermarked media content) as a watermark to the content server 102 for possible future device identification needs.

In some embodiments the content server may retrieve the watermark locally from the secure enclave and encode the watermark into the media content before sending the media content to the secure enclave. This may happen regardless of whether the media player application is part of the secure enclave or not. In addition, the secure enclave may similarly encode the watermark into the decrypted media content regardless of whether the media player application is part of the secure enclave or not, merely as security measure.

In some embodiments, a device may be provided, wherein the device comprises: a graphics component comprising one or more graphical processing units (GPUs) and a secure enclave in communication with the graphics component, comprising: at least one memory comprising computer-executable instructions stored thereon and one or more processing elements to execute the computer-executable instructions to: receive first encrypted media content, decrypt the first encrypted media content using a first decryption key, generate a second decryption key; encrypt the first decrypted media content using the second key, thereby resulting in second encrypted media content and send, to the one or more GPUs, the second encrypted media content and the second decryption key.

In some embodiments, the device may further comprise: at least one second memory comprising second computer-executable instructions stored thereon, one or more second processing elements to execute the second computer-executable instructions to: receive the first encrypted media content from a content server, determine the first encrypted media content is intended for the secure enclave and send at least a portion of the first encrypted media content to the secure enclave.

In some embodiments, the computer-executable instructions may further comprise computer-executable instructions that cause the one or more processing elements to: retrieve a platform identity associated with the device or secure enclave; and encode the platform identity into the decrypted media content as a watermark.

In some embodiments, the platform identity may be based at least in part on one or more of a media access control (MAC) address of the device, an identification number of the device, an identification of the secure enclave, or an Internet Protocol (IP) address associated with the device.

In some embodiments, the computer-executable instructions may further cause the one or more processing elements to: cause to send, to the content server, information associated with the device or a user account associated with the device, wherein the information comprises at least one of payment information and license information; and identify the first decryption key received from the content server.

In some embodiments, the one or more GPUs may: receive the second encrypted media content and the second decryption key; decrypt the second encrypted media content using the second decryption key, thereby resulting in second decrypted media content; render the second decrypted media content; and transmit the second decrypted media content to a media player application.

In some embodiments, wherein the media player application is outside the secure enclave, and wherein the computer-executable instructions may further comprise computer-executable instructions that cause the one or more processing elements to: retrieve a platform identity associated with the device or secure enclave; and encode the platform identity into the decrypted media content as a watermark.

In some embodiments, the computer-executable instructions may cause the one or more processing elements to: cause to send, to the content server, an indication that the media content has been sent to the one or more GPUs.

In some embodiments, the computer-executable instructions may further cause the one or more processing elements to: store the first encrypted media content, the second encrypted media content, the first decryption key, the second decryption key, the first decrypted media content, and the second decrypted media content, wherein the first encrypted media content, the second encrypted media content, the first decryption key, the second decryption key, the first decrypted media content, and the second decrypted media content are secure from access from outside the secure enclave.

In some embodiments, there may be a non-transitory computer readable storage device. The non-transitory computer readable storage device may include instructions stored thereon, which when executed by the one or more processing elements, cause the secure enclave to perform operations of: identifying first encrypted media content; decrypting the first encrypted media content using a first decryption key; generating a second decryption key; encrypting the first decrypted media content using the second key, thereby resulting in second encrypted media content; and causing to send, to the one or more GPUs or a media player, the second encrypted media content and the second decryption key.

In some embodiments, the device may further comprise: at least one second memory comprising second computer-executable instructions stored thereon; one or more second processing elements to execute the second computer-executable instructions for: receiving the first encrypted media content from a content server; and sending at least a portion of the first encrypted media content to the secure enclave.

In some embodiments, the platform identity may be based at least in part on one or more of a media access control (MAC) address of the device, an identification number of the device, an identification of the secure enclave, or an Internet Protocol (IP) address associated with the device.

In some embodiments, the instructions, when executed by the one or more processing elements, may further cause the secure enclave to perform operations of: causing to send, to the content server, information associated with the device or a user account associated with the device, wherein the information comprises at least one of payment information; and identifying the first decryption key received from the content server.

In some embodiments, the instructions, when executed by one or more processing elements, may further cause the secure enclave to perform operations of: determining a media player outside the secure enclave; retrieving a platform identity associated with the device or secure enclave; and encoding the platform identity into the decrypted media content as a watermark.

In some embodiments, the instructions, when executed by one or more processing elements, may further cause the secure enclave to perform operations of: causing to send, to the content server, an indication that the media content has been to the one or more GPUs.

In some embodiments, the instructions, when executed by the one or more processing elements, may further cause the secure enclave to perform operations of: storing the first encrypted media content, the second encrypted media content, the first decryption key, the second decryption key, the first decrypted media content, and the second decrypted media content, wherein the first encrypted media content, the second encrypted media content, the first decryption key, the second decryption key, the first decrypted media content, and the second decrypted media content are secure from access from outside the secure enclave.

In some embodiments, a method may be provided. The method may comprise: receiving, from a content server and by a computing device processor of a secure enclave of a device, first encrypted media content; decrypting, by the computing device processor, the first encrypted media content using a first decryption key; generating, by the computing device processor, a second decryption key; encrypting, by the computing device processor, the first decrypted media content using the second key, thereby resulting in second encrypted media content; and sending, by the computing device processor and to one or more graphical processing units (GPUs) comprised in a graphics component of the device, the second encrypted media content and the second decryption key.

In some embodiments, the method may further comprise: causing to send, to the content server, information associated with the device or a user account associated with the device, wherein the information comprises at least one of payment information and license information; and identifying the first decryption key received from the content server.

In some embodiments, the method may further comprise: retrieving a platform identity associated with the device or secure enclave; and encoding the platform identity into the decrypted media content as a watermark.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation

The invention claimed is:

1. A device comprising:
one or more graphical processing units (GPUs) in communication with a display;
memory including computer-executable instructions; and
processor circuitry to execute the computer-executable instructions to:
establish a secure communication connection with a first secure enclave associated with a content server;
send a message from a second secure enclave associated with the device, the message including information responsive to a request from the first secure enclave;
receive a first decryption key from the content server after the message is sent from the device;
decrypt first encrypted media content using the first decryption key to generate first decrypted media content;
determine that the device does not include a media player within the second secure enclave;
based on determining that the media player is not within the second secure enclave,
enable redistribution detection by encoding platform identity as a combination of location information, user account information and device identifier information in the first decrypted media content, the platform identity corresponding to the device;
generate second encrypted media content by encrypting the first decrypted media content including the combined location information, user account information and device identifier information;
generate a second decryption key, the second decryption key corresponding to a target one of the one or more GPUs; and
send the second encrypted media content and the second decryption key to the target one of the one or more GPUs.

2. The device of claim 1, wherein the processor circuitry is to:
in response to obtaining the first encrypted media content from the content server, determine the first encrypted media content is intended for the second secure enclave; and
send at least a portion of the first encrypted media content to the second secure enclave.

3. The device of claim 1, wherein the processor circuitry is to:
retrieve the platform identity associated with the device or the second secure enclave; and
encode the platform identity into the first decrypted media content as a watermark.

4. The device of claim 3 wherein the platform identity is based at least in part on at least one of
a media access control (MAC) address of the device,
an identification number of the device,
an identification of the second secure enclave, or
an Internet Protocol (IP) address associated with the device.

5. The device of claim 1, wherein the processor circuitry is to:
send, to the content server, information associated with the device or a user account associated with the device, the information including at least one of payment information or license information; and
identify the first decryption key.

6. The device of claim 1, wherein the target one of the one or more GPUs is to:
decrypt the second encrypted media content using the second decryption key to generate second decrypted media content;
render the second decrypted media content on the display; and
transmit the second decrypted media content to the media player.

7. The device of claim 1, wherein the processor circuitry is to cause
transmission of an indication that the second encrypted media content has been sent to the target one of the one or more GPUs.

8. The device of claim 1, wherein the processor circuitry is to cause
storage of the first encrypted media content, the second encrypted media content, the first decryption key, the second decryption key, the first decrypted media content, and second decrypted media content to be secure from access from outside the second secure enclave.

9. A non-transitory computer readable storage device including instructions which, when executed, cause processor circuitry to at least:
establish a secure communication connection with a first secure enclave associated with a content server;
send a message from a second secure enclave associated with a device, the message including information responsive to a request from the first secure enclave;
receive a first decryption key from the content server after the message is sent from the device;
decrypt first encrypted media content received at the device using the first decryption key to generate first decrypted media content;
determine that the device does not include a media player within the second secure enclave;
based on determining that the media player is not within the second secure enclave,
enable redistribution detection by encoding a platform identity as a combination of location information, user account information and device identifier information in the first decrypted media content, the platform identity corresponding to the device;
generate second encrypted media content by encrypting the first decrypted media content including the combined location information, user account information and device identifier information;
generate a second decryption key, the second decryption key corresponding to a target graphical processing unit (GPU); and
cause transmission of the second encrypted media content and the second decryption key to the target GPU.

10. The non-transitory computer readable storage device of claim 9, wherein the instructions, when executed, cause the processor circuitry to:
retrieve the platform identity associated with the device or the second secure enclave; and
encode the platform identity into the first decrypted media content as a watermark.

11. The non-transitory computer readable storage device of claim 10, wherein the platform identity is based at least in part on at least one of
a media access control (MAC) address of the device,
an identification number of the device,
an identification of the second secure enclave, or
an Internet Protocol (IP) address associated with the device.

12. The non-transitory computer readable storage device of claim 9, wherein the instructions, when executed, cause the processor circuitry to:
send, to the content server, information associated with the device or a user account associated with the device, the information including at least one of payment information or license information; and
identify the first decryption key.

13. The non-transitory computer readable storage device of claim 9, wherein the instructions, when executed, cause the processor circuitry to:
determine a media player outside the second secure enclave;
retrieve the platform identity associated with the device or the second secure enclave; and
encode the platform identity into the first decrypted media content as a watermark.

14. The non-transitory computer readable storage device of claim 13, wherein the instructions, when executed, cause the processor circuitry to
send, to the content server, an indication that the second encrypted media content has been sent to the target GPU.

15. The non-transitory computer readable storage device of claim 9, wherein the instructions, when executed, cause the processor circuitry to cause
storage of the first encrypted media content, the second encrypted media content, the first decryption key, the second decryption key, the first decrypted media content, and second decrypted media content to be secure from access from outside the second secure enclave.

16. A method, comprising:
establishing a secure communication connection with a first secure enclave associated with a content server;
sending, by at least one processor circuit programmed by at least one instruction, a message from a second secure enclave associated with a computing device, the message including information responsive to a request from the first secure enclave;
receiving, by one or more of the at least one processor circuit, a first decryption key from the content server after the message is sent from the computing device;
decrypting, by one or more of the at least one processor circuit, first encrypted media content from a content server using the first decryption key to generate first decrypted media content;
determining, by one or more of the at least one processor circuit, that the computing device does not include a media player within the second secure enclave;
based on determining that the media player is not within the second secure enclave,
enabling, by one or more of the at least one processor circuit, redistribution detection by encoding a platform identity as a combination of location information, user account information and device identifier information in the first decrypted media content, the platform identity corresponding to the computing device;
generating second encrypted media content by encrypting, by one or more of the at least one processor circuit, the first decrypted media content including the combined location information, user account information and device identifier information;
generating, by one or more of the at least one processor circuit, a second decryption key, the second decryption key corresponding to a target graphical processing unit (GPU); and
causing transmission, by one or more of the at least one processor circuit, of the second encrypted media content and the second decryption key to the target GPU.

17. The method of claim 16, further including:
causing the content server to send information associated with the computing device or a user account associated with the computing device, the information including at least one of payment information or license information; and
identifying the first decryption key.

18. The method of claim 16, wherein the method further includes:
decrypting the second encrypted media content using the second decryption key to generate second decrypted media content;
rendering the second decrypted media content; and
transmitting the second decrypted media content to the media player.

* * * * *